3,299,562
FISHING LURE
David C. Bennecke, Lake Villa, Ill. 60046
Filed Nov. 27, 1964, Ser. No. 414,108
2 Claims. (Cl. 43—42.17)

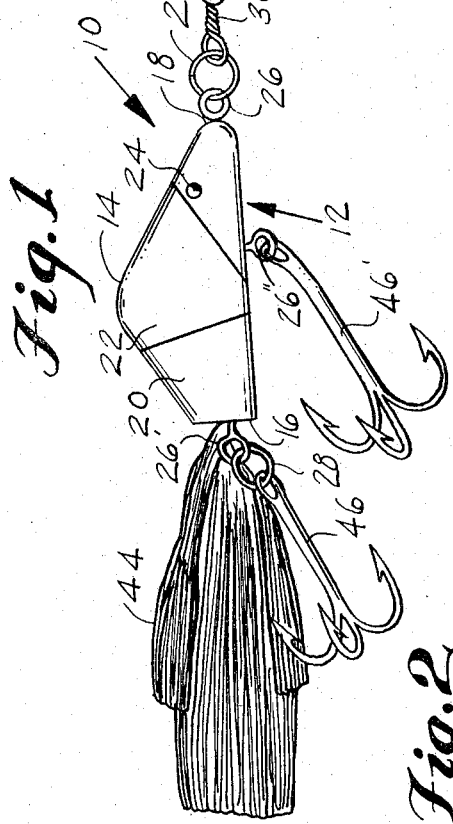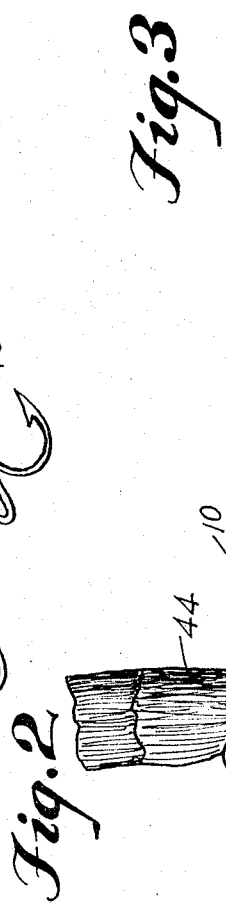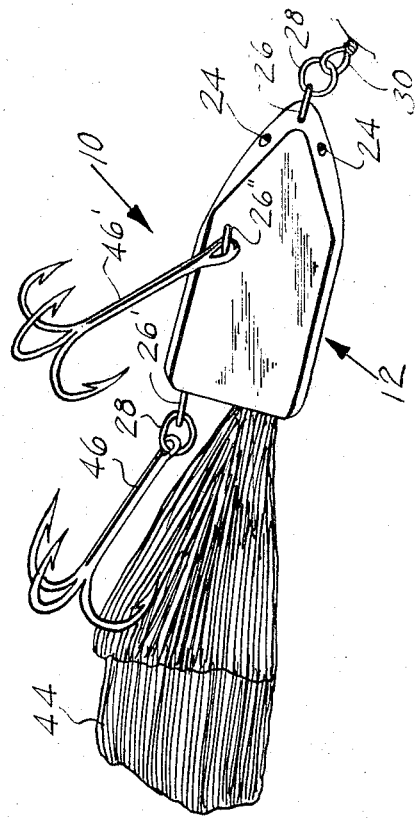

This invention relates to fishing tackle and more particularly to a lure which is active and realistic.

It is an object of the present invention to provide a lure which will ride just above the muskie weeds and with or without weedless hooks will travel through lily pads if they are not too tightly bunched.

Another object of the present invention is to provide a fishing lure which will have body means and tail means for simulating live bait and will have a forward spinner to further attract fish.

A further object of the present invention is to provide a lure of the above type which will have a body of plastic, wood, or other suitable material and will have a pair of spaced apart treble hooks, one of which rides at approximately 30 degrees to the side of the lure, and the hooks by being placed offside cause the plug or lure to ride partially tilted to impart an appearance of an injured minnow to further tantalize the fish.

A still further object of the present invention is to provide a lure which will tend to ride six to eight inches under the surface of the water with a quick retrieve, and if allowed to sink on a cast, will ride at any depth which it has reached at the start of the retrieve, and in certain water conditions will rock up straight and then fall back to its usual side travel at an angle of thirty degrees when being then retrieved toward the angler. The device will further have a split ring attached to the back hook to keep the hook from snagging on the body of the lure when it is cast to prevent tangling.

Other objects of the invention are to provide a fishing lure bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side view of the present invention shown in elevation;

FIGURE 2 is a front view of FIGURE 1; and

FIGURE 3 is a bottom plan view of FIGURE 1.

Referring now more in detail to the drawing, a fishing lure 10 made in accordance with the present invention is shown to include a main body 12 having a humped upper area 14 and a flat rear end 16, while the forward end 18 is rounded to provide smooth parting of the water and a realistic head appearance to lure 10. Main body 12 has a rear colored section 20 and a forward colored section 22 in different colors to further add to the life-like appearance, and a pair of eyes 24 are painted on each side of the main body 12 to further enhance its realistic appearance. A screw eye 26 is threadingly received within the rounded end 18 of main body 12 and a screw eye 26' is threadingly received near one side of the end 16 of main body 12, causing lure 10 to ride slightly tilted in the water to simulate an injured minnow. A screw eye 26" is threadingly received in the underside of main body 12 and is offset from the longitudinal axis of main body 12 and further aids lure 10 to ride in the water in a tilted position simulating an injured minnow. A split ring 28 is received by the forward screw eye 26 and is also received by a twisted eye 30 of wire 32, and the other end of wire 32 is provided with a twisted eye 33 which receives the line of the fisherman's reel. A plurality of spaced apart and bunched beads 34 are received upon wire 32 and a pair of coil springs 36 are positioned between some of the beads 34. A wire clevis 38 is pivotally secured to wire 32 between two pairs of beads 34 and is received freely through the opening 40 of an elliptical spinner 42 to allow the spinner 42 to be free to move throughout various arcs and angles when lure 10 is travelling through the water. These beads are slipped over the wire leader 32 to act as spacers for the spinner which is fastened to the clevis, the latter having openings in each end to slip over the wire leader so as to permit the spinner to revolve around the leader wire 32 freely. The beads also are used to give the added weight for the lure to ride beneath the water surface. The coil springs are merely used for spacers and they slip over the leader wire 32. The beads on both sides of the clevis permit easier spinning of the clevis and the use of the other beads and coil springs place the spinner at the desired position ahead of the main body to give it the weight which is needed. A plastic streamer 44 is fixedly secured adjacent screw eye 26' at the rear end 16 of main body 12 and provides tail means for lure 10. A treble hook 46 is received within split ring 28 which is secured to screw eye 26', and a treble hook 46' is secured directly to screw eye 26" providing a means for hooking and securing the fish when it strikes lure 10.

In use, main body 12 of lure 10, when travelling through the water, travels at an angle due to the treble hooks 46 and 46' which are secured offside, and simulating an injured minnow, and the plastic streamer 44 streams backward on the high side, while wiggling due to the forward motion of lure 10, and the flashing spinner 42 erratically moves by the forward motion of the line attached to lure 10, creating a realistic lure.

It shall be recognized that treble hooks 46, 46' and the spinner 42 being freely attached to the appendages of lure 10 set up an audible vibration in the water to further attract the fish by sound waves.

It shall further be noted that the main body 12 of lure 10 tapers to its widest portion at the base of lure 10, providing an aquadynamic effect and causing lure 10 to rise easily when the angler desires.

While various changes may be made in the detail construction, it shall be understood that such changes shall be within the spirt and scope of the present invention as defined by the appended claims.

What I claim as new desire to protect by Letters Patent of the United States is:

1. A fishing lure comprising, in combination, a pair of spaced apart treble hooks, an elongated, humped main body having a flat base providing attachment means for said pair of treble hooks, a plastic streamer carried by said main body providing tail means offset of the longitudinal axis of said main body, a wire leader and a freely moving spinner having an opening therein carried by said leader providing attraction to said lure when said lure is pulled through the water, the nose of said main body being small and rounded and having eyes painted substantially rearward of said rounded nose to simulate a living creature, the exterior surface of said body being divided into sections of different colors to further simulate a living creature, the upper hump of said main body being tapered from a flat bottom surface of said main body while the rear end of said main body is flat and at right angles to the longitudinal axis of said main body, a forward screw eye being threadingly received within the round nose of said main body, a split ring being received by said screw eye, said split ring further receiving a twisted eye of said leader wire, said leader wire having a twisted eye on the other end to receive the line of a fisherman's reel and pole, said wire being provided with bunched beads, spaced apart beads and a pair of coiled springs freely received between said spaced apart beads, said beads and said coil springs having openings therethrough, said wire being inserted through said openings of said beads and said coil springs, said beads and coil springs serving as spacers, and an area between two of said bunched beads being provided with a wire clevis, said clevis freely receiving the opening of said spinner, said spinner being elliptically configurated and free to move continuously when said lure is in motion in the water, the securement of said pair of spaced apart treble hooks comprising a pair of screw eyes threadingly received, one in the base of the forward end of said main body of said lure and the other of said screw eyes being received in the flat rear end of said main body, and said screw eye received in the rear end of said main body being offset to one side of the longitudinal axis of said main body while the forward screw eye threadingly received within the base of said main body is offset to said one side as well, thus when said main body is being pulled through the water by said fisherman, said main body rides at a tilted angle to simulate a wounded minnow.

2. The combination according to claim 1 wherein said plastic streamer is secured to the flat end of said main body and is spaced apart from said rear screw eye which is offset of said longitudinal axis of said main body and when said lure is pulled through the water, said plastic streamer rides on the high side to further increase the appearance of a live, injured creature.

References Cited by the Examiner
UNITED STATES PATENTS

| | | | |
|---|---|---|---|
| 1,736,403 | 11/1929 | Heddon | 43—42.17 X |
| 1,898,740 | 2/1933 | Novitzky | 43—42.45 |
| 1,993,018 | 3/1935 | Pfeifle | 43—42.17 X |
| 2,622,361 | 12/1952 | Knox | 43—42.48 X |
| 2,754,613 | 7/1956 | Rogers et al. | 43—42.72 X |
| 2,901,856 | 9/1959 | Schwartztrauber | 43—42.72 |

SAMUEL KOREN, *Primary Examiner.*

D. J. LEACH, *Assistant Examiner.*